United States Patent
Creamer et al.

(10) Patent No.: US 9,817,914 B2
(45) Date of Patent: Nov. 14, 2017

(54) EXTENSIBLE MARKUP LANGUAGE (XML) PERFORMANCE OPTIMIZATION ON A MULTI-CORE CENTRAL PROCESSING UNIT (CPU) THROUGH CORE ASSIGNMENT

(75) Inventors: Thomas E. Creamer, Boca Raton, FL (US); Curtis E. Hrischuk, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 2143 days.

(21) Appl. No.: 11/382,315

(22) Filed: May 9, 2006

(65) Prior Publication Data
US 2007/0266380 A1    Nov. 15, 2007

(51) Int. Cl.
*G06F 17/30* (2006.01)
*G06F 17/27* (2006.01)

(52) U.S. Cl.
CPC .... *G06F 17/30896* (2013.01); *G06F 17/2725* (2013.01)

(58) Field of Classification Search
CPC ............ G06F 17/30896; G06F 17/2725
USPC ................... 715/234, 237; 717/149
See application file for complete search history.

(56) References Cited

U.S. PATENT DOCUMENTS

| | | | | |
|---|---|---|---|---|
| 5,812,129 A | * | 9/1998 | Kacor et al. | 715/810 |
| 5,832,262 A | * | 11/1998 | Johnson et al. | 718/102 |
| 5,950,228 A | * | 9/1999 | Scales et al. | 711/148 |
| 6,065,077 A | * | 5/2000 | Fu | 710/100 |
| 6,247,109 B1 | * | 6/2001 | Kleinsorge et al. | 712/13 |
| 6,332,180 B1 | * | 12/2001 | Kauffman et al. | 711/153 |
| 6,356,938 B1 | * | 3/2002 | Munoz et al. | 709/208 |

OTHER PUBLICATIONS

Letz, Stefan; Cell P rocessor-Based Workstationfor CML Offload; Diploma Thesis; Universitat Leipzig; May 2005.

* cited by examiner

*Primary Examiner* — Kyle Stork
(74) *Attorney, Agent, or Firm* — Steven M. Greenberg, Esq.; CRGO Law

(57) ABSTRACT

Embodiments of the present invention address deficiencies of the art in respect to XML schema validation and provide a method, system and computer program product for optimized XML schema validation and XML document parsing. In one embodiment, an XML data processing system can include shared memory; an XML co-processing proxy comprising program code enabled to receive at least one of XML document schema validation and XML document parsing requests from client applications, and at least one XML processing element coupled to the shared memory. In particular, the XML processing element can be configured to perform the at least one of the XML schema validation and XML document parsing on XML documents provided by the XML co-processing proxy. The XML processing element further can be configured to place results of XML schema validation or the XML document parsing in the shared memory.

13 Claims, 2 Drawing Sheets

EXTENSIBLE MARKUP LANGUAGE (XML) PERFORMANCE OPTIMIZATION ON A MULTI-CORE CENTRAL PROCESSING UNIT (CPU) THROUGH CORE ASSIGNMENT

BACKGROUND OF THE INVENTION

Field of the Invention

The present invention relates to Extensible Markup Language (XML) parsing and schema validation, and more particularly to the use of separate processing appliances to perform XML parsing and schema validation.

Description of the Related Art

The Extensible Markup Language (XML) is a markup language specification widely credited with improving the functionality of the World Wide Web by allowing the identification of information in a more accurate, flexible, and adaptable way. XML is referred to as "extensible" because XML is not a fixed format like the hypertext markup language (HTML) which is a single, predefined markup language. Rather, XML is a meta-language that describes other languages. As such, XML allows for the design of other markup languages for limitless different types of documents. XML can act as a meta-language because XML is written according to the standardized general markup language (SGML)—the international standard meta-language for text document markup.

For an XML document to be acceptable to an end user, the XML document must conform to a standard structure. An XML Schema is an XML-based representation of the structure of an XML document. Through its support for data types and namespaces, an XML Schema has the potential to provide the standard structure for XML elements and attributes. As such, prior to utilizing an XML document, the XML document must be validated to ensure that the XML document conforms to its corresponding XML schema.

Validation can involve the parsing of an XML document and the construction of a document object model (DOM) tree for the XML document. Once a DOM tree has been constructed, the nodes of the DOM tree can be traversed in order to confirm that the structure of the XML document conforms to a referenced schema. As it will be apparent then to the skilled artisan, the validation process can be resource consuming in nature. To address the resource consumptive nature of XML document validation, XML processing appliances have been used to perform XML document validation separately from applications requiring XML document processing.

Where a separate XML processing appliance provides XML document validation, a client application can call an application programming interface (API) that forwards the XML document to the XML processing appliance for schema validation. The XML processing appliance can perform schema validation on the received XML document and return a result to the application. As a result, significant performance advantages can be achieved by offloading the XML validation to the XML processing appliance. Yet, significant overhead remains in the packaging and communication of the XML document between the application and the XML processing appliance.

BRIEF SUMMARY OF THE INVENTION

Embodiments of the present invention address deficiencies of the art in respect to XML schema validation and provide a method, system and computer program product for optimized XML schema validation. In one embodiment of the invention, an optimized XML schema parsing and validation method can include placing an XML document in shared memory and signaling an XML processing element operating within a CPU core to process the XML document; receiving a notification to retrieve results provided by the XML processing element in processing the XML document; and, retrieving the results from the shared memory. Additionally, the XML processing element can be disposed in a multi-core CPU and a CPU core in the multi-core CPU can support the operation of the XML processing element.

In one aspect of the invention, receiving a notification to retrieve results provided by the XML processing element in processing the XML document, further can include queuing a pointer to the results; detecting a threshold number of queued pointers to results for XML processing of XML documents; and, forwarding a notification to retrieve the results associated with the queued pointers. In another aspect of the invention, the method can include locating a free XML processing element associated with a corresponding core central processing unit (CPU) in a physical CPU; and, assigning the XML processing element functionality to a generalized core CPU so that it will process the XML document in shared memory. Finally, in even yet another aspect of the invention, the method can include detecting when the XML schema validation process falls out of scope in the client application; and, responsive to the detection, directing the XML processing element to discontinue processing the XML document.

In another embodiment of the invention, an XML data processing system can be provided. The system can include shared memory; an XML co-processing proxy comprising program code enabled to receive XML document schema validation requests from client applications, and at least one XML processing element coupled to the shared memory. In particular, the XML processing element can be configured to perform XML schema validation on XML documents provided by the XML co-processing proxy. The XML processing element further can be configured to place results of XML schema validation in the shared memory.

In one aspect of the invention, the system further can include a multi-core CPU including multiple CPU cores and an administrative CPU. In this regard, selected ones of the CPU cores can support corresponding XML processing elements. Additionally, the system further can include a symmetric multi-processing (SMP) architecture including multiple CPUs. The SMP architecture can include a configuration enabled to host a client application requesting XML schema validation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for optimized XML schema validation and XML document parsing. In accordance with an embodiment of the present invention, one or more local XML processing elements can be assigned to corresponding CPU cores in a multi-core CPU. XML schema validation and XML document parsing operations can be routed from a client application to an available one of the XML processing elements for schema validation or XML document parsing as the case may be. Thereafter, the data resulting from XML schema validation or the XML document parsing can be placed in a shared memory for asynchronous access by the client application. Consequently, the overhead associated with message passing can be avoided and performance enhancements can be achieved in offloaded XML schema validation and XML document parsing.

Figure 1:
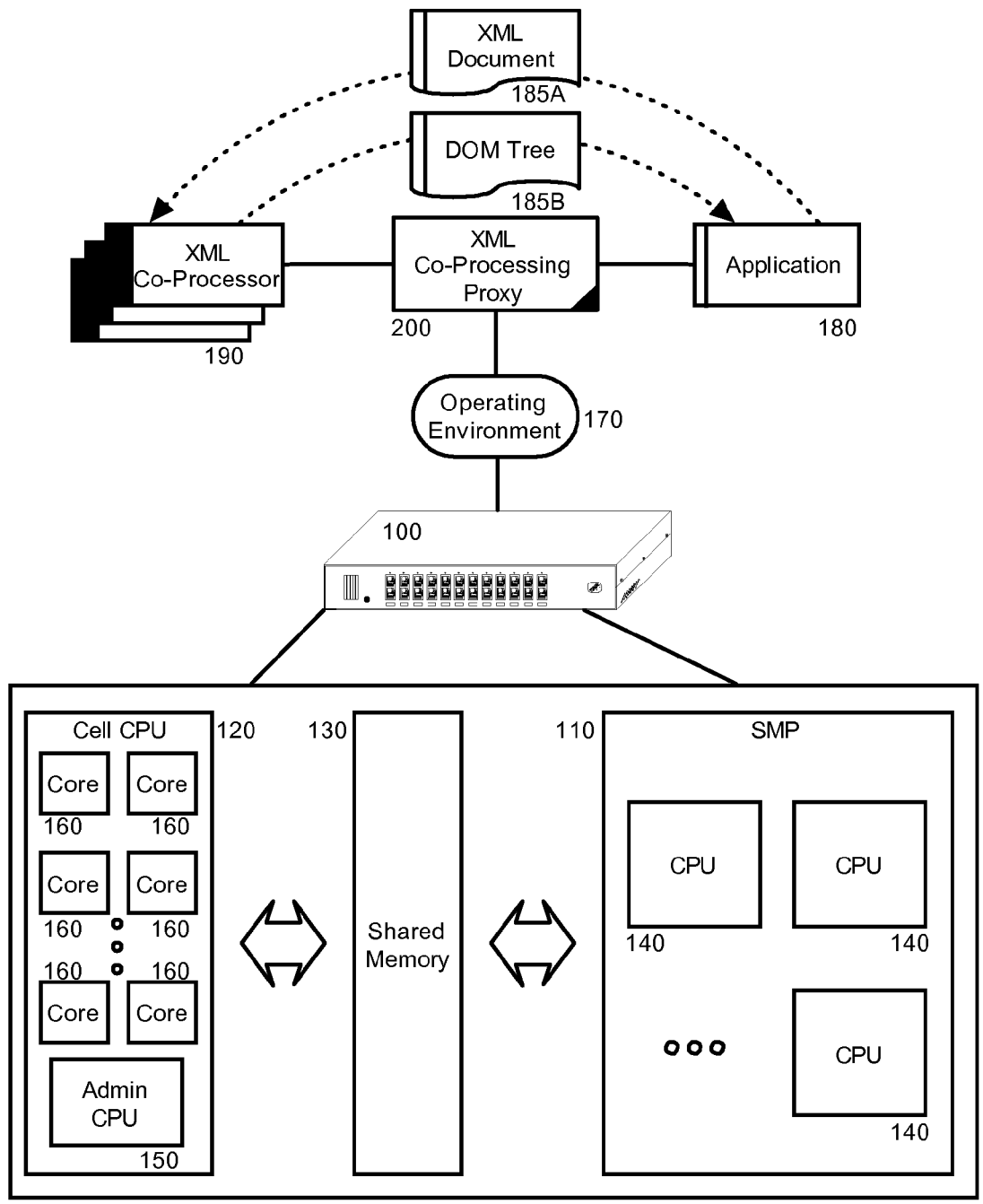
FIG. 1 is a schematic illustration of an optimized XML schema validation and XML document parsing in a data processing system.

In further illustration, FIG. 1 is a schematic illustration of an optimized XML schema validation and XML document parsing data processing system. As shown in FIG. 1, a host computing platform 100 can include an SMP architecture 110 of two or more CPUs 140. The host computing platform 100 further can include at least one multi-core CPU 120 having multiple CPU cores 160 and an administrative CPU 150 enabled to manage the operation and utilization of the CPU cores 160. A shared memory 130 can be disposed between the multi-core CPU 120 and the CPUs 140 of the SMP architecture 110 for utilization by each.

The host computing platform 100 can support the operation of an operating environment 170 including a conventional operating system or one or more virtual machines. As such, the operating environment can manage the execution of a client application 180. The client application 180 can utilize XML document data in an XML document 185A. Processing of XML schema validation and XML document parsing for the XML document 185A, however, can be passed to an available XML processing element 190 assigned to a corresponding one of the CPU cores 160 in the multi-core CPU 120. The available XML processing element 190 can perform XML schema validation or XML document parsing on the XML document 185A and can provide the result 185B to the application.

Notably, an XML co-processing proxy 200 can provide an interface to the XML processing elements 190. In this regard, when the client application 180 attempts to create an XML schema validation or XML document parsing process for an XML document 185A, the XML co-processing proxy 200 can detect the attempt and assign the XML document 185A to an available XML processing element 190. Once resulting output produced by the XML processing element 190 becomes available, the XML co-processing proxy 200 can provide the result 185B to the client application.

Figure 2A:
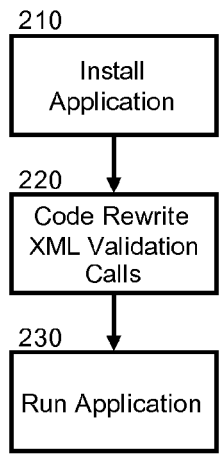
FIGS. 2A and 2B, taken together, are a flow chart illustrating a process for configuring an application for optimized XML schema validation and XML document parsing in the data processing system of FIG. 1; and, FIG. 3 is a block diagram illustrating a process for optimized XML schema validation and XML document parsing in the data processing system of FIG. 1.
Figure 2B:
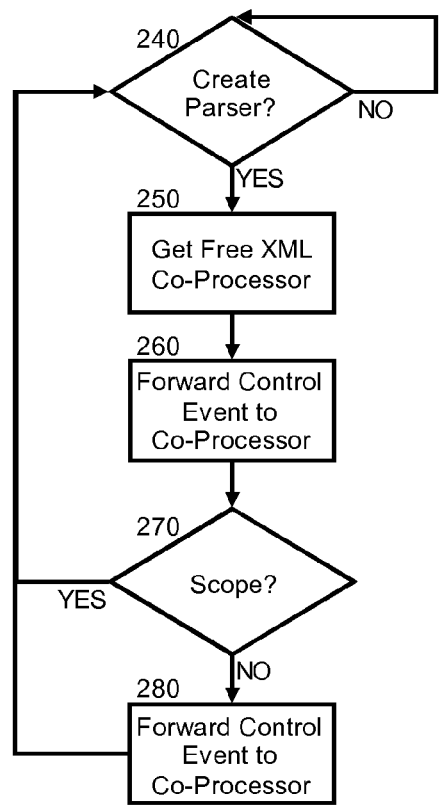

In more particular illustration, FIGS. 2A and 2B, taken together, are a flow chart illustrating a process for configuring an application for optimized XML schema validation and XML document parsing in the data processing system of FIG. 1. As shown in FIGS. 2A and 2B, initially, the client application offloading XML schema validation and XML document parsing can be modified through code re-writing to supplant existing coded calls for XML schema validation or XML document parsing with coded calls to the XML co-processing proxy. Specifically, in block 210, an application can be installed responsive to which in block 220, the code of the application can be re-written in respect to included XML schema validation or XML document parsing calls. Thereafter, in block 230 the application can be executed.

Notably, though code-rewriting can be utilized to achieve the effect of routing XML schema validation and XML document parsing calls to an available XML processing element, other techniques can be equally effective. For instance, regular application programming interface (API) calls for XML schema validation or XML document parsing can be replaced with modified API calls. The modified API calls can include program code enabled to route incoming calls for XML schema validation and XML document parsing to the XML processing elements.

Turning now to FIG. 2B, once the application is executing, in decision block 240 if a call to create an XML parser for an XML document is detected, in block 250 an available XML processing element can be located in association with a core CPU in the cell CPU. Subsequently, in block 260 the call to create the XML parser for the XML document can be converted to a control event and passed to the located XML processing element for processing. When the XML parser falls out of scope in the client application in decision block 270, a control event likewise can be passed to the XML processing element in block 280 in order to cause the cessation of processing in the XML processing element on behalf of the client application.

Figure 3:
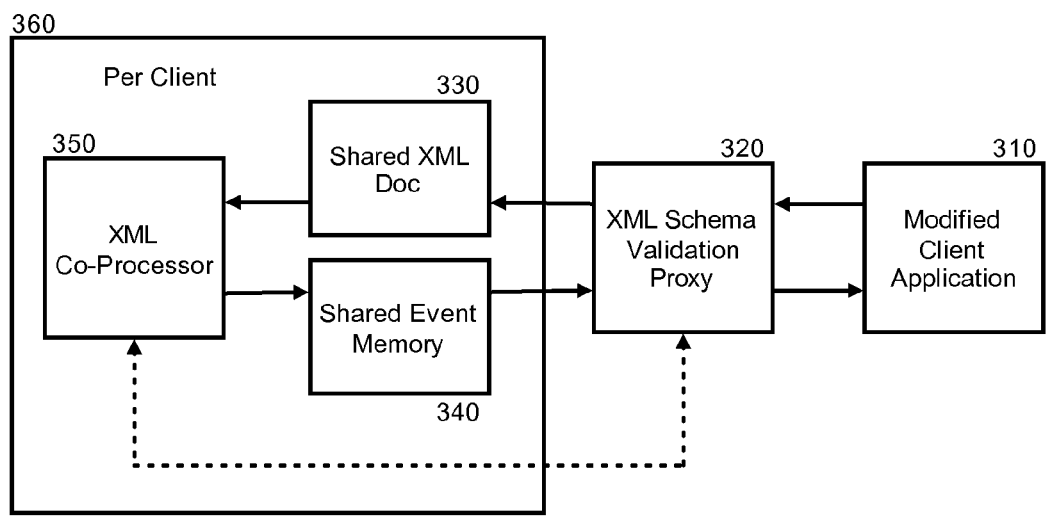

Notably, shared memory can be used to pass XML schema validation results from the XML processing element to the modified client application thereby avoiding the overhead of messaging passing. In illustration, FIG. 3 is a block diagram illustrating a process for optimized XML schema validation in the data processing system of FIG. 1. As shown in FIG. 3, a modified client application 310 can request XML schema validation from the XML schema validation proxy 320. The XML schema validation proxy 320 can pass control instructions to the XML processing element 350 assigned to the client application, while the XML document to be parsed can be placed in shared memory 330 for access by the XML processing element 350.

Processing results provided by the XML processing element 350 likewise can be placed in shared memory 330 and a pointer to the processing results can be placed in a shared event memory queue 340. Once enough processing results have been accumulated, the XML schema validation proxy 320 can notify the modified client application 310. The modified client application 310 in turn can retrieve the processing results by the XML processing element 350 from the shared memory 330. Consequently, the expensive overhead of processing messages between the XML processing element 350 and the modified client application 310 can be avoided.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An optimized extensible markup language (XML) schema validation and XML document parsing method comprising:
    placing an XML document in shared memory disposed between multiple different central processing units (CPUs) of a symmetric multiprocessing (SMP) architecture and a multi-core CPU having multiple CPU cores, and signaling a local XML processing element in one of the multiple CPU cores to process the XML document;
    receiving a notification to retrieve results provided by the XML processing element in processing the XML document; and,
    retrieving the results from the shared memory.

2. The method of claim 1, further comprising rewriting a client application to call an XML co-processing proxy in lieu of creating an XML schema validation or an XML document parsing process to process the XML document.

3. The method of claim 2, further comprising:
    detecting when the XML schema validation or the XML document parsing process falls out of scope in the client application; and,
    responsive to the detection, directing the XML processing element to discontinue processing the XML document.

4. The method of claim 1, further comprising:
    locating a free XML processing element associated with a corresponding core central processing unit (CPU) in the multi-core CPU; and,
    assigning the free XML processing element to process the XML document in shared memory.

5. The method of claim 1, wherein receiving a notification to retrieve results provided by the XML processing element in processing the XML document, further comprises:
    queuing a pointer to the results;
    detecting a threshold number of queued pointers to results for XML processing of XML documents; and,
    forwarding a notification to retrieve the results associated with the queued pointers.

6. An extensible markup language (XML) data processing system comprising:
    shared memory disposed between multiple different CPUs of a symmetric multiprocessing (SMP) architecture and a multi-core CPU having multiple CPU cores;
    an XML co-processing proxy comprising program code enabled to receive XML document schema validation and XML document parsing requests from client applications, and
    at least one XML processing element disposed in one of the multiple CPU cores and coupled to the shared memory and configured to perform at least one of XML schema validation and XML document parsing on XML documents provided by the XML co-processing proxy and to place results of the at least one of XML schema validation and XML document parsing in the shared memory.

7. The system of claim 6, further comprising a cell central processing unit (CPU) comprising a plurality of CPU cores and an administrative CPU, selected ones of the CPU cores supporting corresponding XML processing elements.

8. The system of claim 7, further comprising a symmetric multi-processing (SMP) architecture comprising a plurality of CPUs, the SMP architecture comprising a configuration enabled to host a client application requesting XML schema validation.

9. A computer program product comprising a computer usable storage medium comprising a device having computer usable program code for optimized extensible markup language (XML) schema validation and XML document parsing, the computer program product including:
    computer usable program code for placing an XML document in shared memory disposed between multiple different CPUs of a symmetric multiprocessing (SMP) architecture and a multi-core CPU having multiple CPU cores, and signaling a local XML processing element in one of the multiple CPU cores to process the XML document;
    computer usable program code for receiving a notification to retrieve results provided by the XML processing element in processing the XML document; and,
    computer usable program code for retrieving the results from the shared memory.

10. The computer program product of claim 9, further comprising computer usable program code for rewriting a client application to call an XML co-processing proxy in lieu of creating an XML schema validation or XML document parsing process to process the XML document.

11. The computer program product of claim 10, further comprising:
    computer usable program code for detecting when the XML schema validation or the XML document parsing process falls out of scope in the client application; and, computer usable program code for responsive to the detection, directing the XML processing element to discontinue processing the XML document.

12. The computer program product of claim 11, wherein the computer usable program code for receiving a notification to retrieve results provided by the XML processing element in processing the XML document, further comprises:
- computer usable program code for queuing a pointer to the results;
- computer usable program code for detecting a threshold number of queued pointers to results for XML processing of XML documents; and,
- computer usable program code for forwarding a notification to retrieve the results associated with the queued pointers.

13. The computer program product of claim 9, further comprising:
- computer usable program code for locating a free XML processing element associated with a corresponding core central processing unit (CPU) in the multi-core CPU; and,
- computer usable program code for assigning the free XML processing element to process the XML document in shared memory.

* * * * *